(12) United States Patent
Phillips

(10) Patent No.: US 6,204,811 B1
(45) Date of Patent: Mar. 20, 2001

(54) PIEZOELECTRICAL MECHANICAL ACTUATORS FOR USE WITH SMALL ACTUATOR DISTANCES AND ARRAYS

(75) Inventor: James R. Phillips, Albuquerque, NM (US)

(73) Assignee: CTS Corporation, Elkhart, IN (US)

( * ) Notice: Subject to any disclaimer, the term of this patent is extended or adjusted under 35 U.S.C. 154(b) by 0 days.

(21) Appl. No.: 09/425,631

(22) Filed: Oct. 22, 1999

(51) Int. Cl.$^7$ .................................................. H01P 1/18
(52) U.S. Cl. ........................ 342/372; 310/311; 333/159
(58) Field of Search .................................. 310/328, 311, 310/369, 348; 342/372; 333/159

(56) References Cited

U.S. PATENT DOCUMENTS 6,016,122 * 1/2000 Malone et al. ...................... 342/372

* cited by examiner

Primary Examiner—Mark Hellner
(74) Attorney, Agent, or Firm—James C. Kesterson; Jones, Day, Reavis & Pogue

(57) ABSTRACT

A piezoelectric actuator control circuit includes a first conductor attached to the free end of a piezoelectric device and a second conductor rigidly fixed at a position spaced from the piezoelectric device such that a variable capacitor is created between the first and second conductors. The variable capacitor is then used in a capacitive voltage divider to generate a drive signal which moves the piezoelectric device. Thus, the movement of the piezoelectric device can be precisely controlled. The control circuit allows for precise control of an array of such piezoelectric actuators and is particularly applicable to the use of actuators for controlling a mmWave phase array antenna.

12 Claims, 3 Drawing Sheets

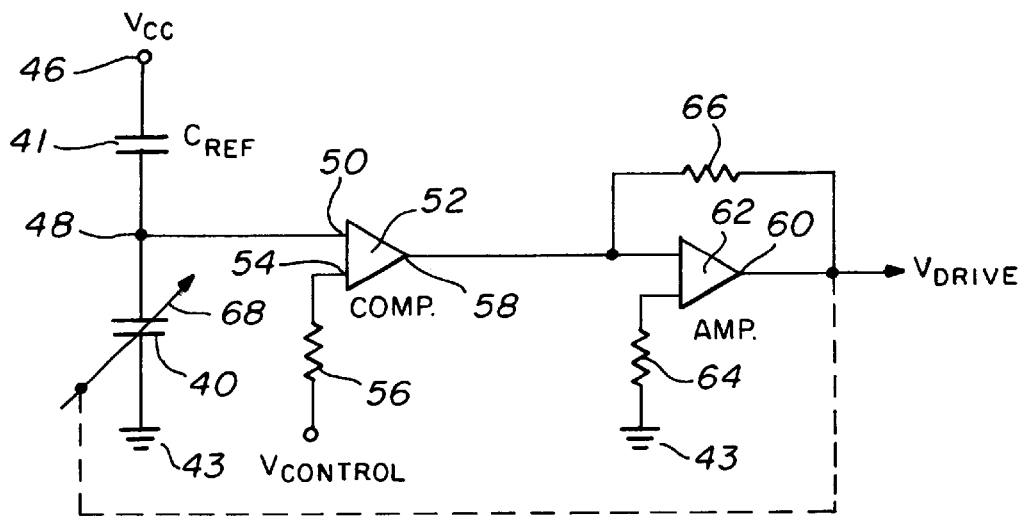
FIG. 5
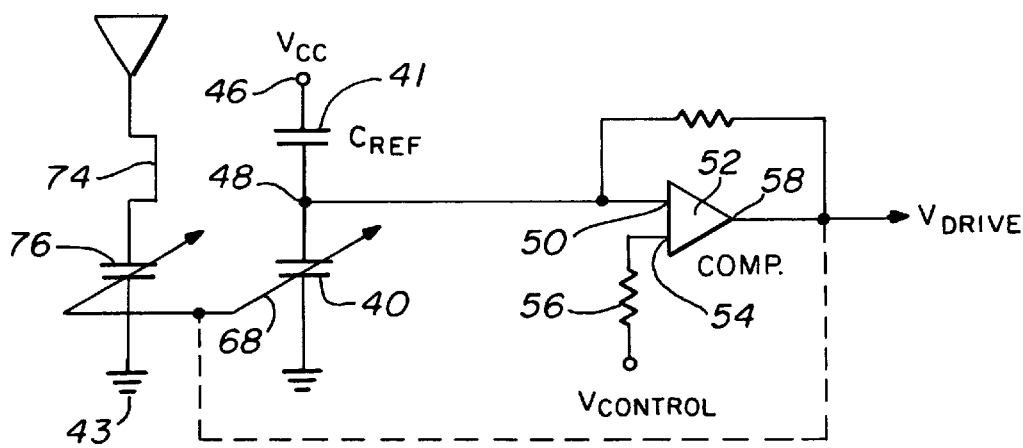
FIG. 8
FIG. 9A     FIG. 9B

PIEZOELECTRICAL MECHANICAL ACTUATORS FOR USE WITH SMALL ACTUATOR DISTANCES AND ARRAYS

BACKGROUND OF THE INVENTION

1. Field of the Invention

The present invention relates to piezoelectric actuators and more particularly to a capacitive sensor system for more accurately moving such actuators to a desired position.

2. Description of Related Art Including Information Disclosed Under 37 CFR 1.97 and 1.98

The use of piezoelectric electric actuators to achieve small controlled movement is not new. For example, U.S. Pat. No. 5,511,931 to T. Arai, et al. discloses the use of six piezoelectric electric actuators for moving a micromotion stage. A holder fixed at one end of the stacked piezoelectric electric element supports a capacitance type displacement gage and a target member so as to form a gap between the two. A change in the distance between the holder and target member caused by expansion or contraction of the piezoelectric electric element is indicated by the capacitance type displacement gage.

Another use of piezoelectric electric devices for small movement is disclosed in U.S. Pat. No. 5,075,600 to El-Hamamsy, et al. According to this patent, an electrodeless high-intensity discharge lamp ballast uses a variable capacitor in series with the excitation coil of the lamp. The variable capacitor includes a fixed conductive plate and a movable conductive plate with a dielectric material, such as Teflon, synthetic resin polymer, mica, or Kapton polyimide film disposed between the two plates. The piezoelectric electric actuator is used to vary the distance between the two conductive plates which changes the capacitance in inverse proportion to the distance moved. Thus, the movable plate is moved from a starting position to a running position to maintain the ballast load in "tune" under both the starting and running conditions.

As was discussed above, piezoelectric electric devices can be used as small actuators to produce very small movements of small components. The amount of movement or final position of the actuator is directly controlled by the level of voltage applied. Unfortunately, movement of the piezoelectric electric actuator is not linear with respect to the applied voltage.

Therefore, to accurately position piezoelectric electric actuators in the past, a position translator such as an encoder was attached to the actuator, and the output of the encoder was then used in a feedback link to indicate when the correct position was achieved. Unfortunately, such encoder systems are not only expensive, but are also extremely impractical for use with an array of such piezoelectric electric actuators which are packed close together. Other attempts to provide the necessary feedback have included the use of a potentiometer which acts as a position indicator. Although less expensive than an encoder, the use of a potentiometer is still impractical to use with a large array of such small actuators, and does not work well with the small movements created by a piezoelectric electric actuator.

There are also examples of capacitance sensor systems available in the prior art. For example, see U.S. Pat. No. 5,594,353 issued to B. D. Hemphill which measures the change in capacitance values in a pair of capacitors which share a common electrode.

U.S. Pat. No. 5,633,594 issued to H. Okada describes a capacitor sensor system which applies first and second driving signals which are opposite in face to a sensor capacitor and a reference capacitor, respectively. The two capacitors are in turn connected to circuitry which generates a signal in response to the differences in potential.

U.S. Pat. No. 5,786,698 to R. E. Mallory discloses apparatus for boot strapping an amplifier of a capacitive displacement transducer. The apparatus replaces a transformer with two capacitors and two resisters configured to provide biased supply voltage. This arrangement provides similar performance at a reduced size and cost.

SUMMARY OF THE INVENTION

Therefore, it is an object of the present invention to provide inexpensive and simple apparatus and methods for providing a linear and accurate position indication of the small distances traveled by a piezoelectric electric actuator.

It is a further object of the invention to provide an electrical signal representation of the accurate position of a piezoelectric electric actuator.

It is still another object of the invention to provide an extremely small apparatus for providing an accurate position indication suitable for use with an array of piezoelectric electric actuators wherein said array is on the order of at least 1200 actuators.

Therefore, it is an object of the present invention to provide a piezoelectric electric actuator control circuit which comprises a support member, defining a support portion and an opposite portion. A piezoelectric electric stack device is attached to the support portion at a first end and then has a free end which is located proximate to the opposite of said support member. A first conductor is attached to the opposite portion of said support member and a second conductor is attached to the free end of said piezoelectric electric device such that said first and second conductors are spaced apart so as to define a gap and thereby form a capacitor. A drive circuit is connected to the piezoelectric device for generating a drive signal for causing movement of said free end of the piezoelectric device with respect to the opposite portion of the support structure. Movement of the free end of the piezoelectric device varies the distance or gap between the first and second conductors and thereby changes the value of any capacitance formed by the first and second conductors. Finally, an adjusting circuit responsive to the capacitance of the capacitor formed by the first and second conductors adjust the drive signal to accurately locate the free end of the piezoelectric device at a selected position.

In a preferred embodiment, a multiplicity of the piezoelectric actuators are arranged in a closely spaced phase array antenna having selectable steering. The gap between the free end of the piezoelectric device and the opposite portion of the support structure also functions as the adjustable portion of a steerable phased array antenna.

Also in a preferred embodiment, the piezoelectric actuators include an adjusting circuit which receives an input control signal representative of a desired selected position of the free end of the piezoelectric device and is comprised of a capacitive voltage divider which includes the variable capacitor formed by the first and second conductors and at least one other capacitor. The output of the capacitive voltage divider is then compared to the input control voltage and the output used to adjust the drive signal.

BRIEF DESCRIPTION OF THE DRAWINGS

These and other features of the present invention will be more fully disclosed when taken in conjunction with the following Detailed Description of the Invention in which like numerals represent like elements and in which:

FIG. 5 shows a part schematic and part pictorial representation of a drive circuit using the variable capacitor formed by the piezoelectric device to vary the voltage drive output to achieve a desired position;

FIG. 8 is an electrical equivalent circuit of one element of the array of FIG. 7; and FIGS. 9A, and 9B show a cross section of FIG. 7 with examples of antenna signal steering according to the teachings of the present invention.

DETAILED DESCRIPTION OF THE INVENTION

Figure 1A:
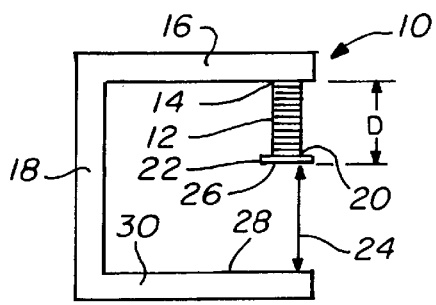
FIGS. 1A, 1B, and 1C show examples of a piezoelectric stack in its unenergized position a midpoint position and a fully energized position, respectively.
Figure 1B:
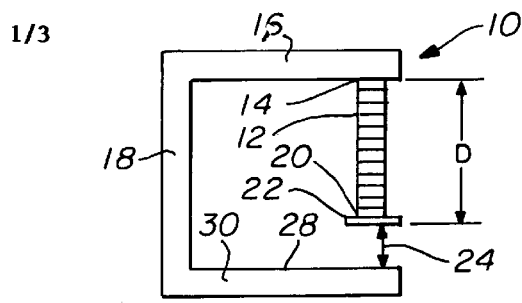
Figure 1C:
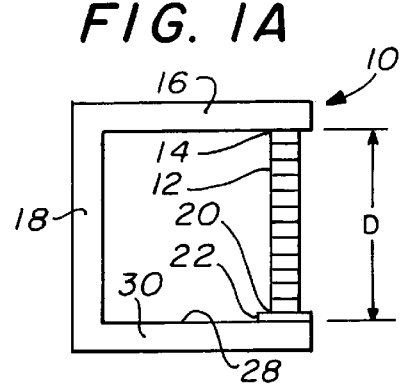
Figure 2:
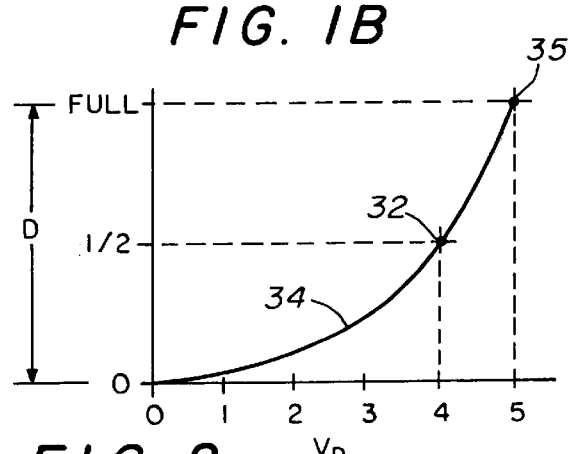
FIG. 2 is a graph of the displacement of the piezoelectric stack device and the drive voltage required to move the device from its unenergized position to its fully energized position.

Referring now to FIGS. 1A, 1B, and 1C there is shown, as an example only, a piezoelectric device which (a) is subjected to substantially a "0" volt drive voltage (FIG. 1A), (b) is subjected to a voltage which drives the device to a point equal to one-half of its possible displacement (FIG. 1B), and (c) wherein the device is subjected to a voltage where the device is driven to its full displacement respectively. FIG. 2 is a graph of the displacement of the device of FIG. 1 as it responds to different drive voltages. It will be appreciated by those skilled in the art that FIGS. 1A, 1B, and 1C are not to scale, and that the indicated movement of the piezoelectric stack is exaggerated for illustration purposes.

As shown, device 10 includes a piezoelectric device 12 attached at a first end 14 to leg 16 of C-shaped support member 18. The free end 20 of said piezoelectric device 12 is shown with a cap member 22 which moves between an inactive point or 0 displacement as shown in FIG. 1A to the fully displaced position as shown in FIG. 1C, and as indicated by double-headed arrow 24. When the piezoelectric device is subjected to a sufficient drive voltage, cap member 22 moves the total full possible displacement or gap. In the embodiment shown, cap member 22 moves to a point where the gap between the unattached face 26 of cap member 22 and face 28 of leg 32 of C-shaped support member 18 is zero. It should be understood, that the embodiment disclosed in FIGS. 1A, 1B, and 1C are for illustration purposes and are only intended to suggest one possible structure which may be used to support the piezoelectric device as used in the present invention. Any other structure which supports the piezoelectric stack so that its end moves with respect to another fixed structure would be suitable.

As shown in the graph of FIG. 2, it is seen that the relationship between the applied drive voltage V plotted on the horizontal axis and the displacement D plotted on the vertical axis is not linear. More specifically, as shown in FIG. 2, it takes more drive voltage (for example approximately 4 units of voltage) to move cap member 22 the first one-half of the possible displacement as indicated at point 32 on curve 34 than it does to move it the second one-half of the displacement to the full extension point 35. For example, it takes only one additional unit of voltage more than required to achieve movement through the first half or about five voltage units total. Consequently, as was discussed above, if piezoelectric electric devices were used in the prior art to achieve movement, it was necessary to fix a position translator, such as an encoder or potentiometer to the device and then use the output of the encoder or potentiometer as a position feedback link. Of course, such an approach was expensive and impractical for small actuators and especially impractical for an array of small actuators.

Figure 3A:
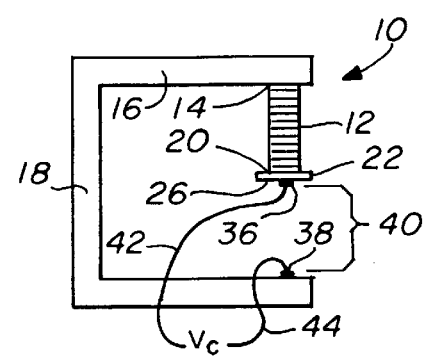
FIGS. 3A, 3B, and 3C are similar to the illustrations of FIGS. 1A, 1B, and 1C except they further include a pair of conductive electrodes or plates opposite each other which form a variable capacitor.
Figure 3B:
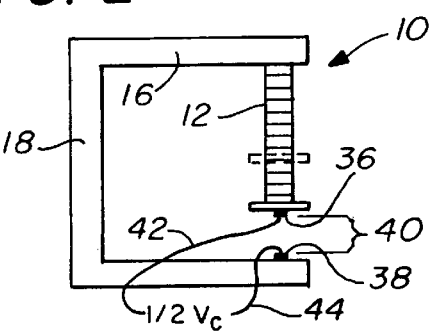
Figure 3C:
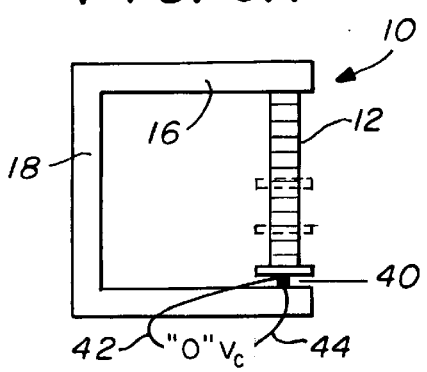

Referring now to FIGS. 3A, 3B, and 3C, there is shown a simplified illustration of the present invention. As shown, FIGS. 3A, 3B, and 3C are substantially similar to FIGS. 1A, 1B, and 1C except the unattached face 26 of cap member 22, and face 28 of leg 30 of support member 10, each further includes a conductive plate or member 36 and 38, respectively. Conductive plates 36 and 38 are aligned so that a capacitor 40 is created therebetween and such that displacement or movement of the piezoelectric device varies the capacitance of the resulting capacitor 40 (see FIG. 5). A wire or connector, such as wires 42 and 44, are connected one each to the conductive plates 36 and 38 such that the capacitor 40 can be incorporated into an electronic circuit.

Figure 4:
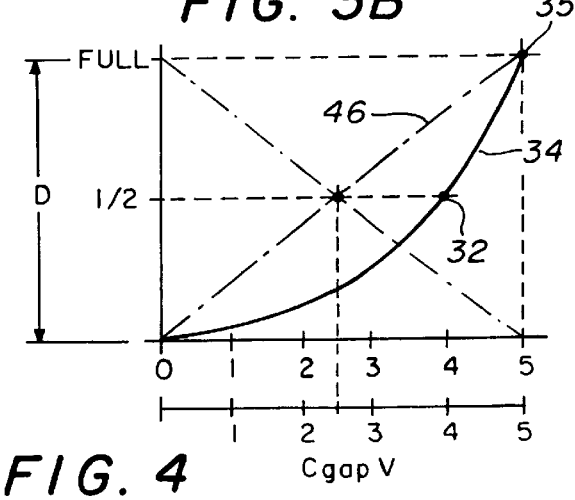
FIG. 4 is a graph showing the displacement of the piezoelectric stack in response to the applied voltage as was discussed with respect to FIG. 2 but also shows varying the linear capacitance of a capacitor formed by the piezoelectric device.

In a like manner, the graph of FIG. 4 is substantially similar to that shown in FIG. 2, except that it further illustrates the relationship between the displacement or movement of the piezoelectric device as discussed above and the capacitance and/or voltage resulting between the two conductive plates 36 and 38 as discussed above. It is also important to note that the relationship between the capacitance and the displacement is substantially a linear relationship as indicated by the straight line 46.

Referring now to the electrical schematic of FIG. 5, there is shown a simplified feedback circuit incorporating the variable capacitor 40 as discussed above for controlling the drive voltage applied to piezoelectric device 12 and thereby providing for inexpensive and precise control of the movement or displacement of the piezoelectric device 12. As shown, the circuit of FIG. 5 includes a capacitive voltage divider scheme using the variable capacitor 40 created by conductive plates 36 and 38 as discussed above and a reference capacitor 41. Variable capacitor 40 and reference capacitor 41 are connected between ground 43 and an input voltage $V_{CC}$ shown at input 46. Voltage $V_{CC}$ is preferable an AC voltage, although a DC voltage will work in many applications. Thus, it will be appreciated that the voltage at node 48 of FIG. 5 between capacitors 40 and 41 will vary as the capacitance of variable capacitor 40 changes. This varying voltage at node 48 is then provided to an input 50 of comparator 52. The other input 54 of comparator 52 is provided from a control voltage $V_C$ through a resistor 56. Thus, the output 58 of comparator 52 may be used to generate the drive voltage on output 60 to the piezoelectric device 12. In the embodiment shown there is also included a simple amplifier circuit 62 which receives the output 58 as one input and the other input is connected to ground through resistor 64. Such an amplifier circuit will also typically include a feedback loop as indicated at 66. The voltage on output 60 of amplifier 62 then provides the drive voltage used to cause movement of the piezoelectric device 12. As shown in the schematic of FIG. 5, the drive voltage on output 60 is shown connected to the arrow 68 indicating the variability of capacitor 40 to show that this applied voltage causes changes to the variable capacitor 40.

Thus, it can be seen to this point that there has been disclosed a simple and inexpensive technique for providing feedback to a piezoelectric device which provides movement so as to more precisely control such movement.

As was mentioned above, the present invention is particularly useful with an array of piezoelectric actuators. One unusually valuable application of an array of piezoelectric actuators is for controlling a mmWave phase array antenna operating between a range of about 15 GHz to about 39 GHz and preferably at about 30 GHz. Such a mmWave phase array antenna may actually require on the order of 1200 actuators for proper resolution and control. To date, the phase array actuators for antennas have been limited to military use because of the extremely high cost of such a large number of actuators which will be on the order of tens of millions of dollars. Such an amount unquestionably is far in excess of the allowable costs for the consumer market, since it is believed that the acceptable cost for the consumer market is no more than about $300 to $700. It is also believed that the present invention allows for the manufacturer of a mmWave phase array antenna at a price in this range.

Figure 6A:
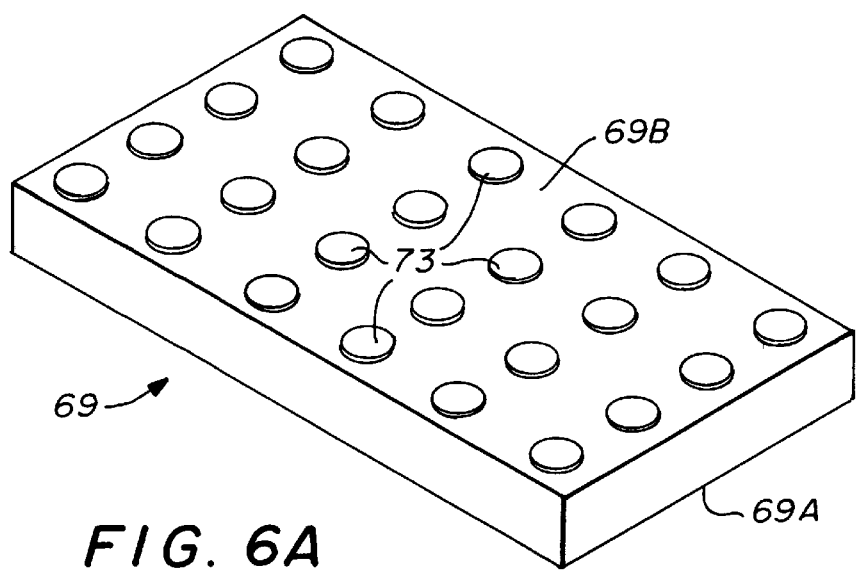
FIG. 6A shows a simplified version of a T-line antenna array.
Figure 6B:
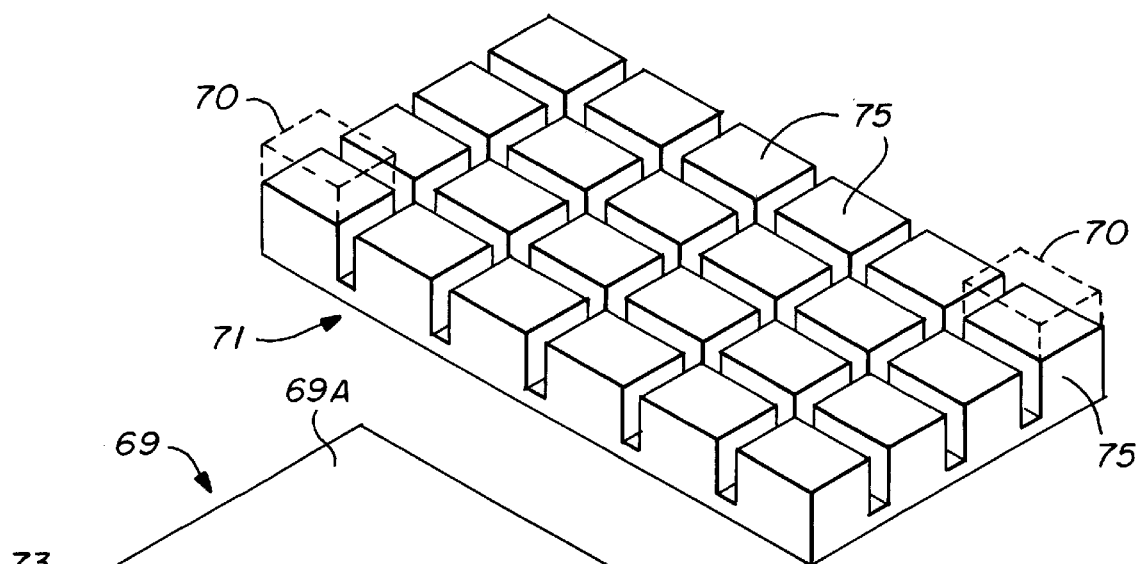
FIG. 6B illustrates a piezoelectric array used to vary the gap between the piezoelectric array and the T-line array to achieve steering.
Figure 7:
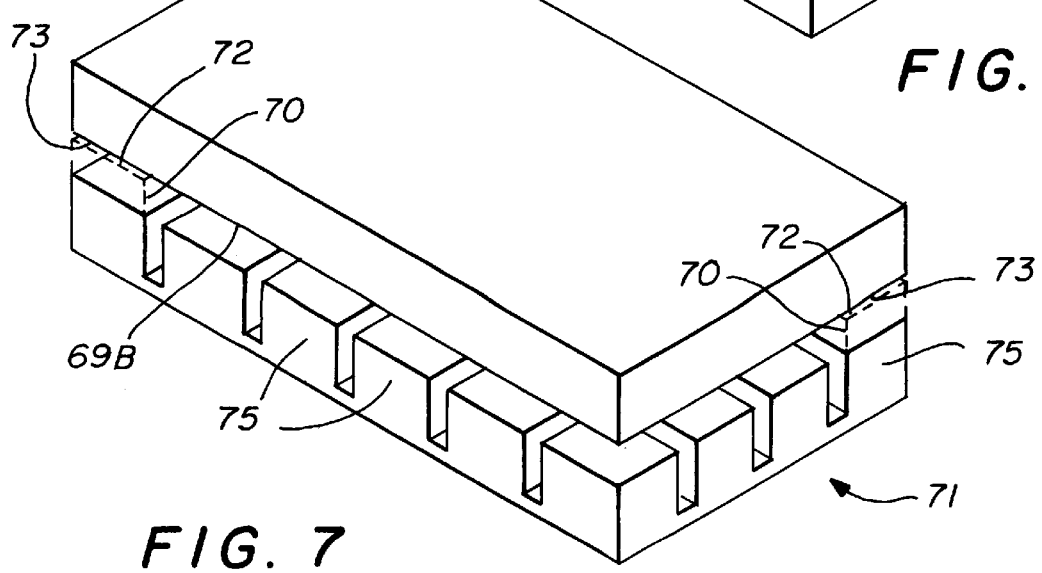
FIG. 7 is an assembled version of the T-line array of FIG. 6A and the piezoelectric array of FIG. 6B.

Referring now to FIGS. 6A and 6B, there is a very simplified 24 element T-line antenna array 69, having a top side 69a and an antenna side 69b. Also shown is a matching 24 element piezoelectric array 71 which may be assembled as shown in FIG. 7 to provide a very small 24 element phased array antenna. It will be appreciated, of course, that an actual phase array antenna would typically be substantially greater than 24 adjustable elements (preferably on the order of 1200 elements), and that the embodiments shown in FIGS. 6A, 6B, and 7 are for illustrative purposes only. A 1200 element array would be constructed in the same manner only it would of course include many, many more elements. The phantom lines 70 of FIG. 6B show how the free end of the elements extend when subjected to a voltage so as to close the gap 72 shown in FIG. 7 which, as discussed above, varies the capacitance.

As shown in FIG. 7, the individual elements, such as element 73 of the T-line antenna array of FIG. 6A are positioned adjacent the individually controllable free ends (such as end 75) of the piezoelectric array shown in FIG. 6B after FIG. 6A has been rotated 180 degrees. FIG. 7 shows how the T-line array of FIG. 6A is rotated 180 degrees and then placed adjacent the piezoelectric array of 6B such that T-line antenna element 73 is positional approximate piezoelectric array element 75. The two portions represented by FIGS. 6A and 6B are then rigidly secured with respect to each other to achieve the combination array of FIG. 7. Thus, it should be understood that the gap or spacing 72 between the free end of each piezoelectric element and the corresponding element of the T-line antenna array may be readily adjusted as shown in FIGS. 9A and 9B to provide steering which will be discussed hereinafter.

Referring to FIG. 8, there is shown the controlling circuitry for one of the variable antenna elements of the array made from the combination of the piezoelectric control element such as discussed above and the antenna element 74. As shown, the control circuit is substantially the same as was discussed above with respect to FIG. 5, but does not include the additional amplifier 62. There is also included a second variable capacitor 76 which moves in the same manner as the control circuit variable capacitor 40. Variable capacitor 76 changes the capacitance connected to the antenna element 74.

Thus, array steering is achieved by precisely controlling each of the gaps between the T-line antenna and its corresponding piezoelectric array element.

FIGS. 9A and 9B show a simplified cross section of the combination array of FIG. 7 with selected resulting gaps and antenna direction of the array as indicated by arrows 78 and 80.

The corresponding structures, materials, acts, and equivalents of all means or step plus function elements in the claims below are intended to include any structure, material, or act for performing the function in combination with other claimed elements as specifically claimed.

What is claimed is:

1. A piezoelectric actuator control circuit comprising:
   a support member defining a support portion and an opposite portion;
   a piezoelectric device having a first end attached to said support portion and a free end proximate said opposite portion;
   a first conductor attached to said opposite portion of said support member;
   a second conductor attached to said free end of said piezoelectric device such that said first and second conductors are spaced apart so as to define a gap and thereby form a capacitor;
   a drive circuit connected to said piezoelectric device for generating a drive signal for causing movement of said free end of said piezoelectric device and wherein movement of said free end varies the distance or gap between said first and second conductors to thereby change the capacitance or said capacitor formed by said first and second conductors; and
   an adjusting circuit responsive to said capacitance of said capacitor formed by said first and second conductors for adjusting said drive signal to locate said free end of said piezoelectric device at a selected position.

2. The control circuit of claim 1 wherein said adjusting circuit receives an input control signal representative of a desired selected position of said free end of said piezoelectric device and wherein said adjusting circuit includes a capacitive voltage divider comprised of said capacitor formed by said first and second conductors and at least one other capacitor and wherein the output of said capacitive voltage divider is compared to said input control signal to adjust said drive signal.

3. An array of closely-arranged piezoelectric actuators comprising:
   a support structure having a support portion and an opposing portion;
   a multiplicity of first conductors attached to said opposing portion of said support structure;
   a multiplicity of piezoelectric actuators attached to said support portion of said support structure, each of said multiplicity of piezoelectric actuators comprising:
   a piezoelectric device having a movement axis extending between a first end attached to said support portion and a free end located proximate one of said multiplicity of said first conductors;

a second conductor attached to said free end of said piezoelectric device such that said first and second conductors are spaced apart so as to define a gap and thereby form a capacitor;

a drive circuit connected to said piezoelectric device for generating a drive signal for causing movement of said free end of said piezoelectric device and wherein movement of said free end varies the distance or gap between said first and second conductors; and an adjusting circuit responsive to the capacitance of said capacitor formed by said first and second conductors for adjusting said drive signal to locate said free end of said piezoelectric device at a selected position.

4. The array of claim 3 wherein each of said adjusting circuits receives an input control signal representative of a desired selected position of said free end of said piezoelectric device and wherein each of said adjusting circuits includes a capacitive voltage divider comprised of said capacitor formed by said first and second conductors and at least one other capacitor and wherein the output of said capacitive voltage divider is compared to said input control signal to adjust said drive signal.

5. The array of claim 3 and further comprising a control device for determining said selected position for each of said piezoelectric actuators.

6. The array of claim 4 and further comprising a control device for determining said selected position for each of said piezoelectric actuators and a signal generator for generating an input control signal representative of said selected position.

7. A phased array antenna having selectable steering comprising:

a T-line antenna array comprised of a multiplicity of antenna elements, each element including a first conductor portion;

a support structure having a support portion for supporting a multiplicity of piezoelectric actuators and an opposing portion for supporting said T-line antenna array;

a multiplicity of piezoelectric actuators, said multiplicity being of substantially a like number as said multiplicity of antenna elements, and each piezoelectric actuator comprising:

a piezoelectric device having a movement axis extending between a first end attached to said support portion and a free end located proximate a first conductor portion of one of said multiplicity of antenna elements;

a second conductor portion attached to said free end of said piezoelectric device such that said first and second conductors are spaced apart so as to define a gap and thereby form a capacitor, said free ends of said multiplicity of said piezoelectric devices and said multiplicity of T-line antenna elements further defining said phased array antenna;

a drive circuit connected to said piezoelectric device for generating a drive signal for causing movement of said free end of said piezoelectric device and wherein movement of said free end varies the distance or gap between said first and second conductors;

an adjusting circuit responsive to the capacitance of said capacitor formed by said first and second conductors for adjusting said drive signal to locate said free end of said piezoelectric device at a selected position; and a computing device for determining said selected position for each of said piezoelectric actuators necessary to steer said phased array antenna.

8. The phased array antenna of claim 7 wherein said multiplicity of piezoelectric actuators comprises 1200actuators.

9. The phased array of claim 7 wherein said antenna is a mmWave antenna.

10. The phased array antenna of claim 7 wherein each of said adjusting circuits receives an input control signal representative of said selected position of said free end of its associated piezoelectric device and wherein each of said adjusting circuits includes a capacitive voltage divider comprised of said capacitor formed by said first and second conductors and at least one other capacitor and wherein the output of said capacitive voltage divider is compared to said input control signal to adjust said drive signal.

11. The phase array antenna of claim 7 wherein said antenna is responsive to signals having a frequency of between about 15 GHz and about 39 GHz.

12. The phase array antenna of claim 11 wherein said antenna is responsive to signals having a frequency of about 30 GHz.

* * * * *